United States Patent
Wagner (10) Patent No.: US 7,966,224 B1
(45) Date of Patent: Jun. 21, 2011

(54) SYSTEM, METHOD AND COMPUTER PROGRAM PRODUCT FOR GENERATING A RELATIONSHIP-BASED RECOMMENDATION

(75) Inventor: Eran Wagner, Los Altos, CA (US)

(73) Assignee: Amdocs Software Systems Limited, Dublin 3 (IE)

( * ) Notice: Subject to any disclaimer, the term of this patent is extended or adjusted under 35 U.S.C. 154(b) by 1213 days.

(21) Appl. No.: 11/413,494

(22) Filed: Apr. 27, 2006

(51) Int. Cl.
*G06Q 30/00* (2006.01)

(52) U.S. Cl. ............. 705/26.7; 705/26; 705/27; 705/14; 705/35; 705/36 R; 705/41; 707/104.1; 710/18; 725/116

(58) Field of Classification Search .................... 705/14, 705/26, 35.36 R, 35, 36 R, 41, 27, 26.7; 710/18; 725/116
See application file for complete search history.

(56) References Cited

U.S. PATENT DOCUMENTS

| 6,266,649 | B1 | 7/2001 | Linden et al. ................... 705/26 |
| 6,611,881 | B1* | 8/2003 | Gottfurcht et al. .............. 710/18 |
| 2005/0171799 | A1* | 8/2005 | Hull et al. ........................ 705/1 |
| 2006/0167942 | A1* | 7/2006 | Lucas et al. ................ 707/104.1 |
| 2007/0033256 | A1* | 2/2007 | Ben-Itzhak ................... 709/206 |

\* cited by examiner

*Primary Examiner* — Yogesh C Garg
(74) *Attorney, Agent, or Firm* — Zilka-Kotab, PC (57) ABSTRACT

A system, method and computer program product are provided for providing recommendations. In use, a plurality of contacts is identified, where each contact has a relationship with a user. In addition, information associated with activities of at least one of the contacts is received such that a recommendation may be generated for the user, based on the information.

24 Claims, 6 Drawing Sheets

SYSTEM, METHOD AND COMPUTER PROGRAM PRODUCT FOR GENERATING A RELATIONSHIP-BASED RECOMMENDATION

BACKGROUND AND FIELD OF THE INVENTION

The present invention relates to recommendation systems, and more particularly to making recommendations for a particular user.

SUMMARY

A system, method and computer program product are provided for providing recommendations. In use, a plurality of contacts is identified, where each contact has a relationship with a user. In addition, information associated with activities of at least one of the contacts is received such that a recommendation may be generated for the user, based on the information.

DETAILED DESCRIPTION

Figure 1:
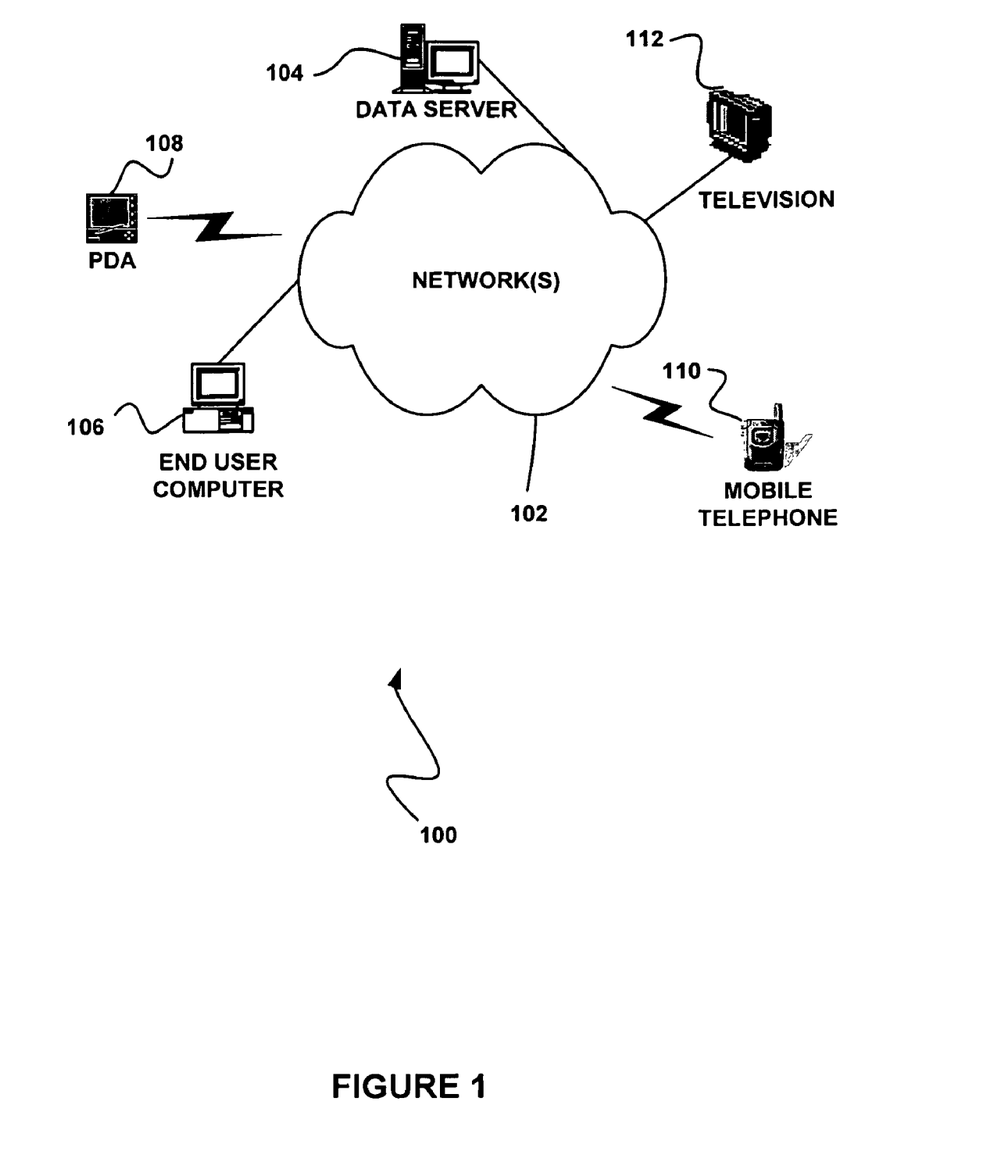
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a telecommunications network, a local area network (LAN), a wireless network, a wide area network (WAN) such as the Internet, cable network, peer-to-peer network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

It should be noted that any of the foregoing devices in the present network architecture 100, as well as any other unillustrated hardware and/or software, may be equipped with the capability of generating recommendations for users based on contacts who have relationships with the users. More exemplary information regarding such architecture and associated functionality will be set forth hereinafter in greater detail.

Figure 2:
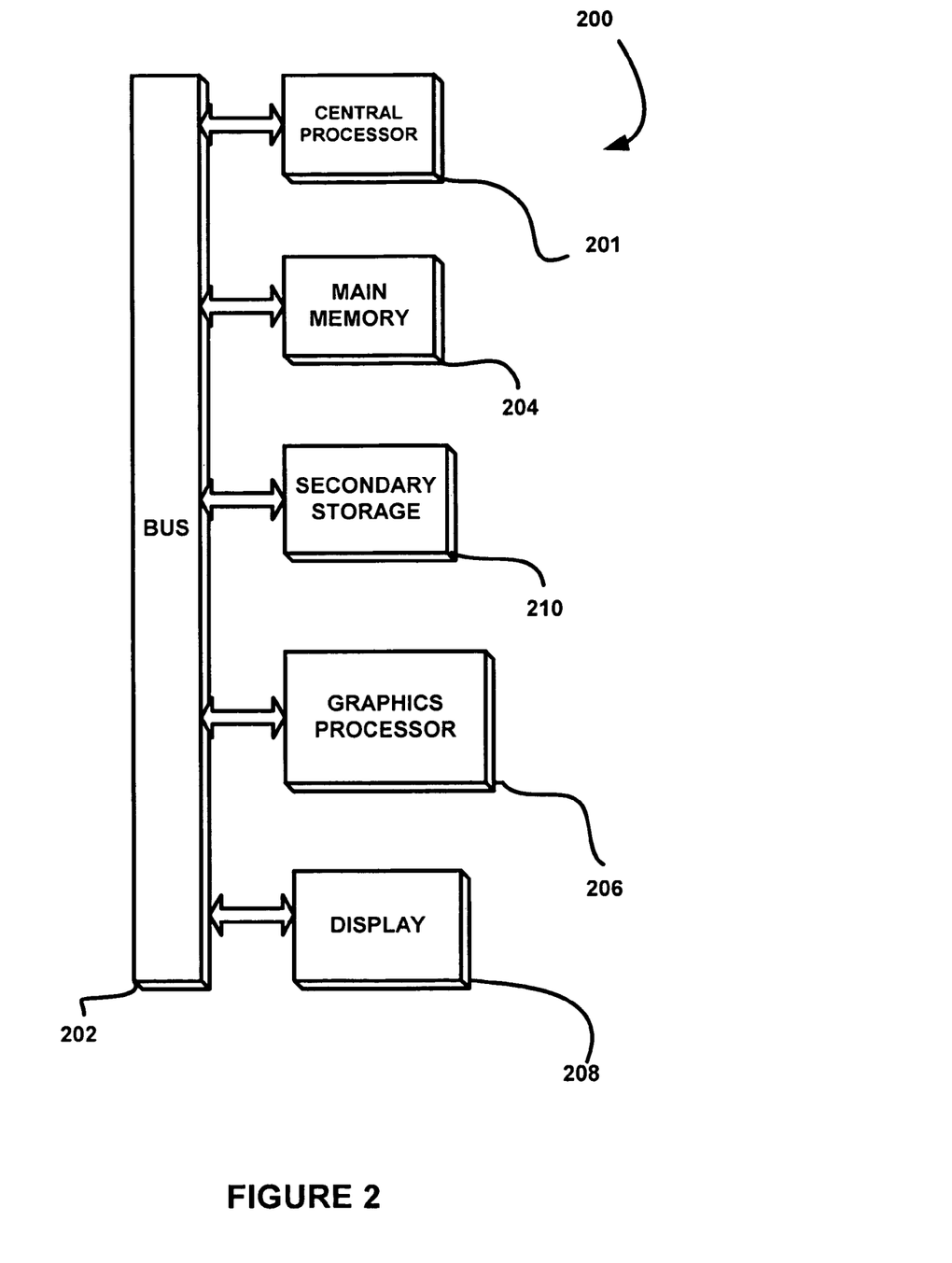
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media.

Figure 3:
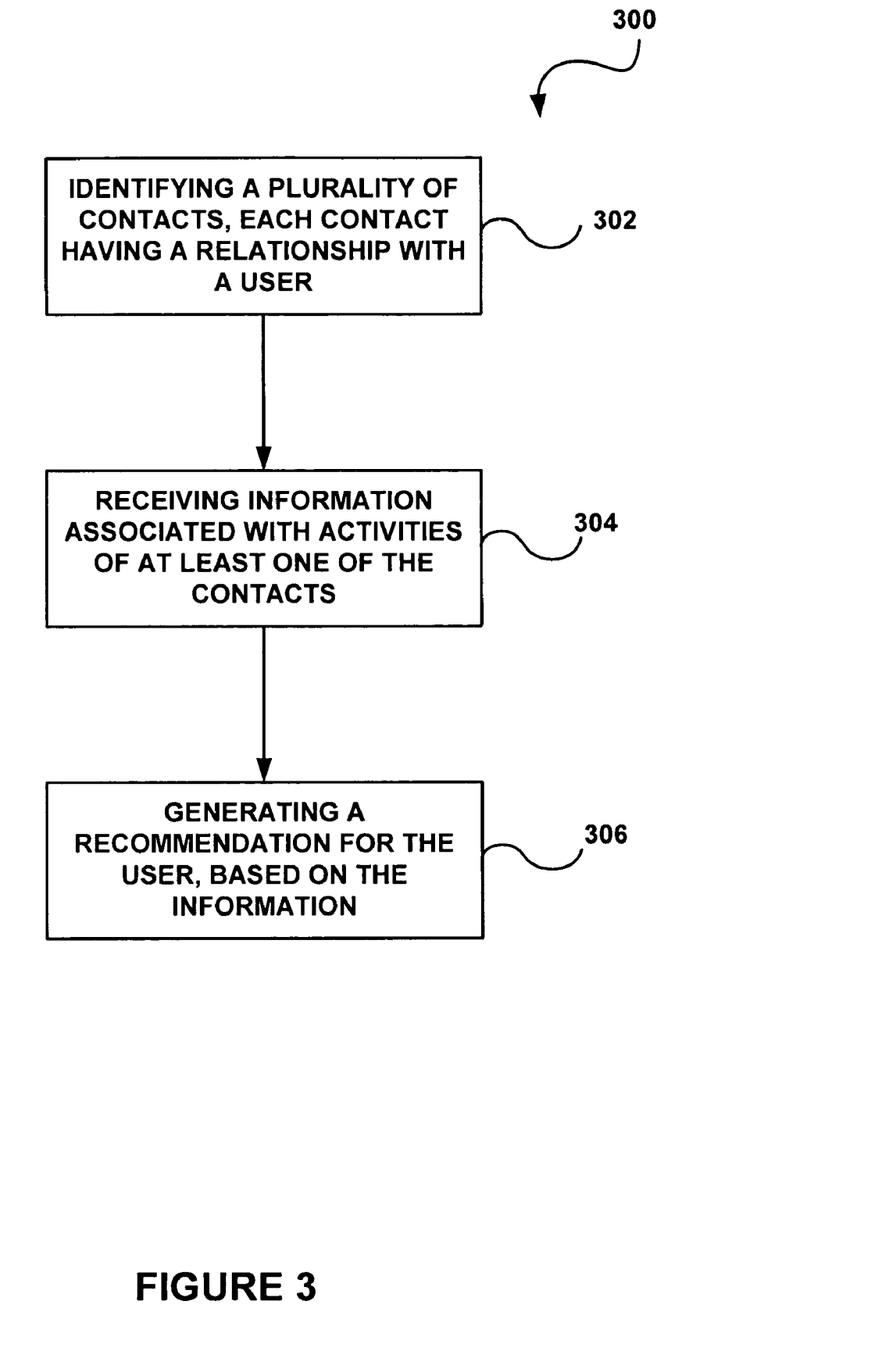
FIG. 3 illustrates a method for generating a relationship-based recommendation, in accordance with one embodiment.

FIG. 3 illustrates a method 300 for generating a relationship-based recommendation, in accordance with one embodiment. As an option, the present method 300 may be implemented in the context of the architecture and environment of FIGS. 1 and/or 2. Of course, however, the method 300 may be implemented in any desired environment.

As shown in operation 302, a plurality of contacts is identified, where each contact has a relationship with a user. In the context of the present description, the user may include any person capable of contacting a contact and/or capable of generating a list of contacts, by way of any of the devices shown in FIG. 1, such as, for example, a computer, a mobile telephone, a personal digital assistant, etc. Further, the plurality of contacts may each include any person capable of having a relationship with the user.

In various embodiments, the aforementioned relationship between the contact and the user may be a direct relationship or an indirect relationship. For example, each contact may be a direct contact of the user, or an indirect contact of the user by virtue of being a contact of a direct contact of the user. Illustrative examples of such specific relationships and the identification thereof will be described in further detail with respect to FIG. 4, in the context of additional embodiments. Of course, it should be noted that the contacts may be identified in any automated and/or manual manner.

Next, in operation 304, information associated with activities of at least one of the contacts is received. The received information may include, for example, websites visited by the at least one contact, companies with which the contact has communicated, television content viewed by the contact, and/or any other information relating to activities of the contact. Still yet, in the context of the present description, the activities may each include any activity in which the contact is at least capable of being engaged.

For example, in additional exemplary embodiments, the received information may include feedback from the contact in response to an activity performed by the contact. For instance, the contact may provide feedback on a television show, a particular business with which the contact is associated, a website the contact visited, etc. In this way, the user's contacts' activities may be monitored/identified and received, along with explicit feedback of the contact(s), for further analysis, as will be described in further detail with respect to FIG. 5. Again, however, it should be noted that the received information may relate to any aspect of activities in which the contact is at least capable of being engaged.

Based on the received information of operation 304, a recommendation may then be generated for the user, as shown in operation 306. The recommendation may include a list of content, such as, for example, a list of websites, television content, and/or any other type of content capable of being generated based on the received information. As an option, in some embodiments, the contents of the list of content may even be prioritized. Such optional prioritization will be described in further detail with respect to FIG. 5. Of course, it should be noted that the recommendation may take any form that is capable of being generated based on the received information.

More illustrative information will now be set forth regarding various optional architectures and uses in which the foregoing method 300 may or may not be implemented, per the desires of the user. It should be strongly noted that following information is set forth for illustrative purposes and should not be construed as limiting in any manner. Any of the following features may be optionally incorporated with or without the exclusion of other features described.

Figure 4:
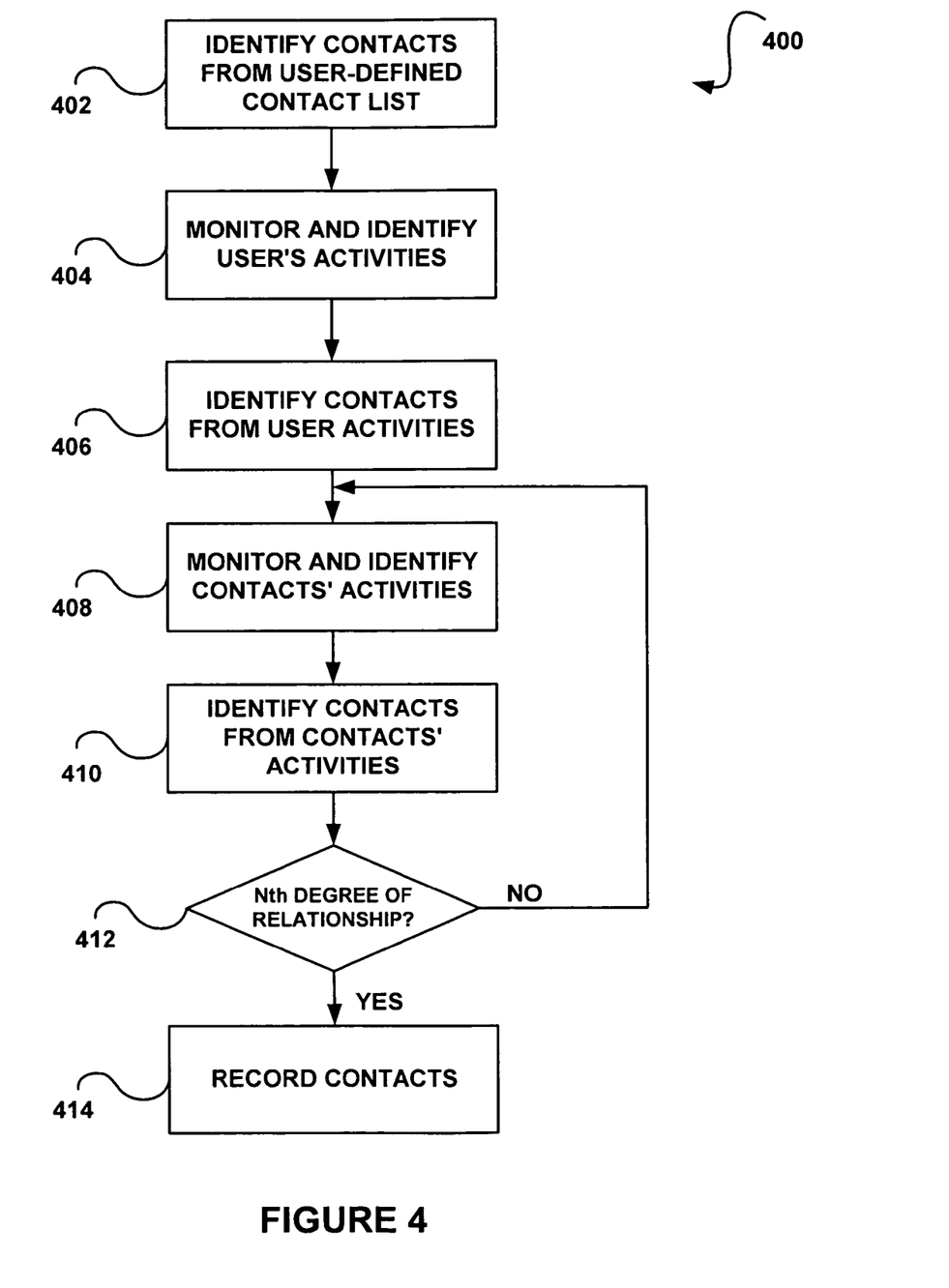
FIG. 4 illustrates a method for generating a contact group, in accordance with another embodiment.

FIG. 4 illustrates a method 400 for generating a contact group, in accordance with another embodiment. As an option, the method 400 may be implemented in the context of the details of FIGS. 1-3. Of course, however, the method 400 may be carried out in any desired environment. Further, the aforementioned definitions may equally apply to the description below.

As shown in operation 402, contacts are identified from a user-defined contact list. Such user-defined contact list may include any type of list of contacts with which the user is associated. For example, the user-defined contact list may be an address book in a user's personal digital assistant, a phone book in a user's mobile phone, an address book associated with a user's electronic mail, and/or any other user-defined contact list associated with a device utilized by the user. Additionally, the user-defined contact list may be comprised of contacts which the user has input into a graphical user interface of an application, where the application is, at least in part, designed to collect and maintain the user-defined contact list.

Thus, in use, the method 400 may identify the contacts by extracting contact information, such as a name, phone number, etc., from the user-defined contact list. Of course, it may be determined in operation 402 that the user is not associated with a user-defined contact list, in a situation where the user has not created such a list, for example.

In operation 404, the user's activities are monitored and identified. As described above with respect to FIG. 3, such activities may include any activity including, but not limited to wireline telephone calls involving the user, wireless telephone calls involving the user, electronic mail sent to and/or received by the user, instant message sent to and/or received by the user, etc. As an option, the user's activities may be monitored for a predetermined time. For example, such predetermined amount of time may be set as a function of a number of contacts that is desired, an arbitrary time frame, etc.

Further, in one embodiment, the user's activities may be automatically identified utilizing an agent. More specifically, such agent may run on devices utilized by the user, such as the devices described with respect to FIG. 1. As a further option, such agents may intercommunicate via a network and/or direct communication link for sharing contact-related information, etc.

The identified user activities are then utilized to identify contacts of the user. See operation 406. For instance, if the user communicates with a new contact by way of a wireline or wireless phone call, such contact's information may be identified via the device utilized by the contact (or the user) during the call. In another instance, if the user emails a new contact, such contact's information may be identified via the email. Of course, contacts may be identified through any communication technique utilized by a user to communicate with a contact. In addition, if an agent is used to monitor and identify the user's activities in operation 404, such agent may also be utilized to automatically identify the contact.

Once the user's contacts have been identified from operations 402 and 406, the user's contacts' activities may be monitored and identified, as indicated in operation 408. Such activities may be monitored and identified in any desired manner, such as, for example, the manner described above with respect to operation 404. To accomplish this, in accordance with one optional embodiment, the aforementioned agent(s) may be proliferated during communications between users and contacts. Of course, such contacts may be prompted before receiving and executing such agent(s).

Just by way of example, when the user initiates an instant messaging session with a new contact, an automated message may be displayed to the contact which asks the contact to confirm whether he/she wants to be a contact of the user. If the contact responds affirmatively, the appropriate agent may be downloaded onto the communication device being utilized by the contact (e.g. computer, personal digital assistant, mobile telephone, etc.) and may be used to receive information associated with activities of the contact on such device. Furthermore, the agent may optionally populate itself onto other devices used by the contact such that information associated with a plurality of the contact's devices may be received, etc.

From the monitoring and identification of the contacts' activities in operation 408, the contacts of the user's contacts may be identified, as illustrated in operation 410. Thus, a second degree of relationship of contacts (e.g. with an indirect relationship, etc.), with respect to the user, may be identified. In one instance, the contacts of the user's contacts may also be identified by a contact-defined contact lists (not shown). In such an example, such contact-defined contact lists may be identified, processed, etc. in the same or similar manner described above with respect to operation 402.

It should be noted that the user's contacts, although described as being identified above with respect to operations 402 through 410, may be identified utilizing only one of such techniques, and/or may be identified utilizing any other additional techniques capable of identifying contacts.

It is then determined in decision 412 whether the contacts identified from the user's contacts' activities meet a predefined threshold. Such predefined threshold may include, for example, a degree of relationship between the user and a particular contact. Of course, however, other thresholds may also be utilized for determining whether specific contacts should be included in the present method 400. For example, the threshold may include a threshold number of contacts that are to be identified, may involve a blacklisting function, etc. In addition, a degree of relationship threshold may be used in conjunction with a threshold number of contacts to limit the number of contacts identified.

If it is determined in decision 412 that the identified contacts of operation 410 do not meet the predetermined threshold, the method 400 returns to operation 408 to continue to monitor and identify those contacts' activities. In this way, the method 400 may continue to identify contacts up to a predefined threshold of contacts. If, however, it is determined in decision 412 that the identified contacts of operation 410 do meet the predetermined threshold, all of the identified contacts are recorded, as shown in operation 414. Additionally, the identified activities of the identified contacts from operation 408 may also be recorded (not shown). In this way, a predefined threshold may be utilized to build a user's contact group.

An example of use will now be set forth. Specifically, in the case of a threshold involving a predefined degree of relationship, if the predefined threshold is a degree of relationship of four (4), the user's contact group will include the following: the user's contacts (contacts1), the contacts of each of the contacts in contacts1 (contacts 2), the contacts of each of the contacts in contacts2 (contacts3), and the contacts of each of the contacts in contacts3 (contacts4). As an option, the user's contact group may even be stored as a tree, where each level of branches in the tree represents a degree of relationship and includes the contacts for each such particular degree of relationship.

As an option, after the contacts are recorded in operation 414, the method 400 may return to operation 404 to monitor and identify additional user and contact activities for identifying additional contacts which were not previously identified, thus expanding the user's recorded contacts. The method 400 may also first return to operation 402 to further determine whether any additions and/or deletions have been made to any user-defined contact lists. Alternatively, after the contacts are recorded in operation 414, the method 400 may start over by identifying all user contacts for a subsequent specified period of time, etc.

Figure 5:
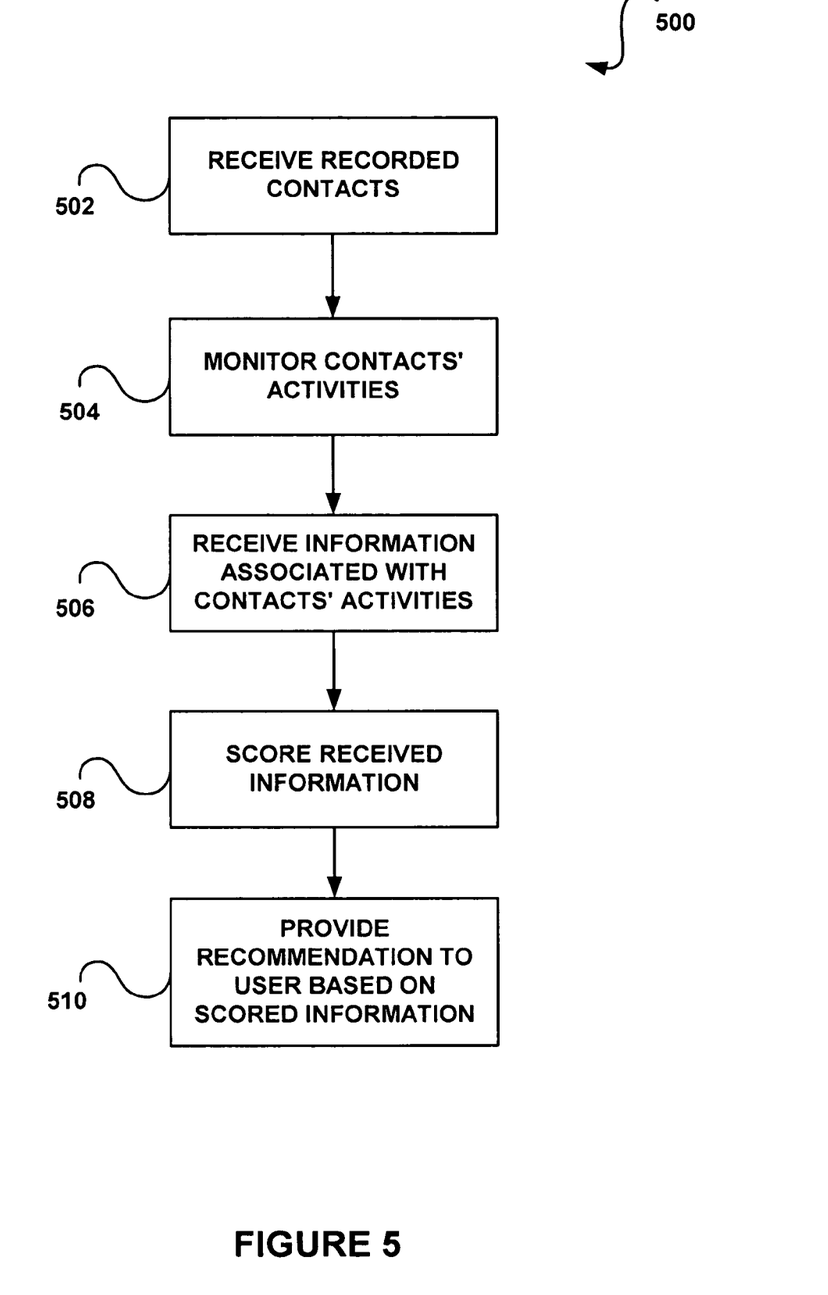
FIG. 5 illustrates a method for providing a relationship-based recommendation, in accordance with still another embodiment.

FIG. 5 illustrates a method 500 for providing a relationship-based recommendation, in accordance with one embodiment. As an option, the method 500 may be implemented in the context of the details of FIGS. 1-4. Of course, however, the method 500 may be carried out in any desired environment. Further, the aforementioned definitions may equally apply to the description below.

As shown in method 500, recorded contacts are received. The recorded contacts may include the contacts recorded in operation 414 of FIG. 4, but, of course, may include any contacts that are capable of being recorded. The activities of the recorded contacts are then monitored and recorded, as in operation 504. In another embodiment, as described above, the contacts' recorded activities of operation 414 of the method 400 of FIG. 4 may be utilized. To this end, various operations of the method 400 and method 500 may be executed in parallel and may further be used for multiple purposes, in some embodiments.

From such identified activities 504, information associated with the activities of at least one of the contacts may be received and optionally recorded, as shown in part in operation 506. Such information may include specific content associated with an activity of the contact. The information may also optionally include statistics. For example, the statistics may be derived from content received by at least one of the contacts and/or from feedback provided by the at least one of the contacts.

Thus, for example, the statistics may be derived from a web page, television content, digital book, etc. received by the contact and/or any feedback the contact has with regard to such content. Of course, the statistic may be derived from any information associated with the contacts. Furthermore, the statistics may be derived over a predetermined period of time and may be aggregated in a database.

The information of operation 506 may be received utilizing, for example, an agent located on the device of the contact. Using such agent and/or any other mechanism, the received information of operation 506 may then be scored. Note operation 508.

The score may be based on a plurality of parameters, including, but not limited to, a degree of relationship between the user and the contact associated with the information, user-defined interest areas, a user-configured parameter, etc. Furthermore, the score may be based on a balancing of the importance of older information as opposed to more recently received information. Such score may then be utilized to prioritize the information and provide such information to the user in the form of a recommendation. See operation 510. Thus, a recommendation may be made to the user in the form of a list of content, where the contents in the list of content may be optionally prioritized.

In various embodiments, the recommendation in operation 510 may be sent to the user via electronic mail. Further, the recommendation may be displayed to the user utilizing a favorites menu, as will be described in further detail with respect to FIG. 6. Of course, it should be noted that the recommendation may be provided to the user in any desired manner (e.g. utilizing a mobile phone menu, etc.). In this way, the method 500 provides a technique for a recommendation on content to be made to a user utilizing the activities and/or feedback of the user's contacts. After the recommendation is made to the user, the method 500 may return to operation 502 to receive a new recorded contact list. In this way, recommendations may be made with updated contact lists on a continuous basis.

As an option, the user may be provided with a recommend contents list from a latest period of time from which recorded contacts were received (i.e. a latest recommended contents list that has been created for the latest period of time). Still yet, the user may be provided with an on-demand recommended contents list, such that the recorded contacts of operation 502 are received and the information scored in operation 508 upon the user requesting a recommendation.

Figure 6:
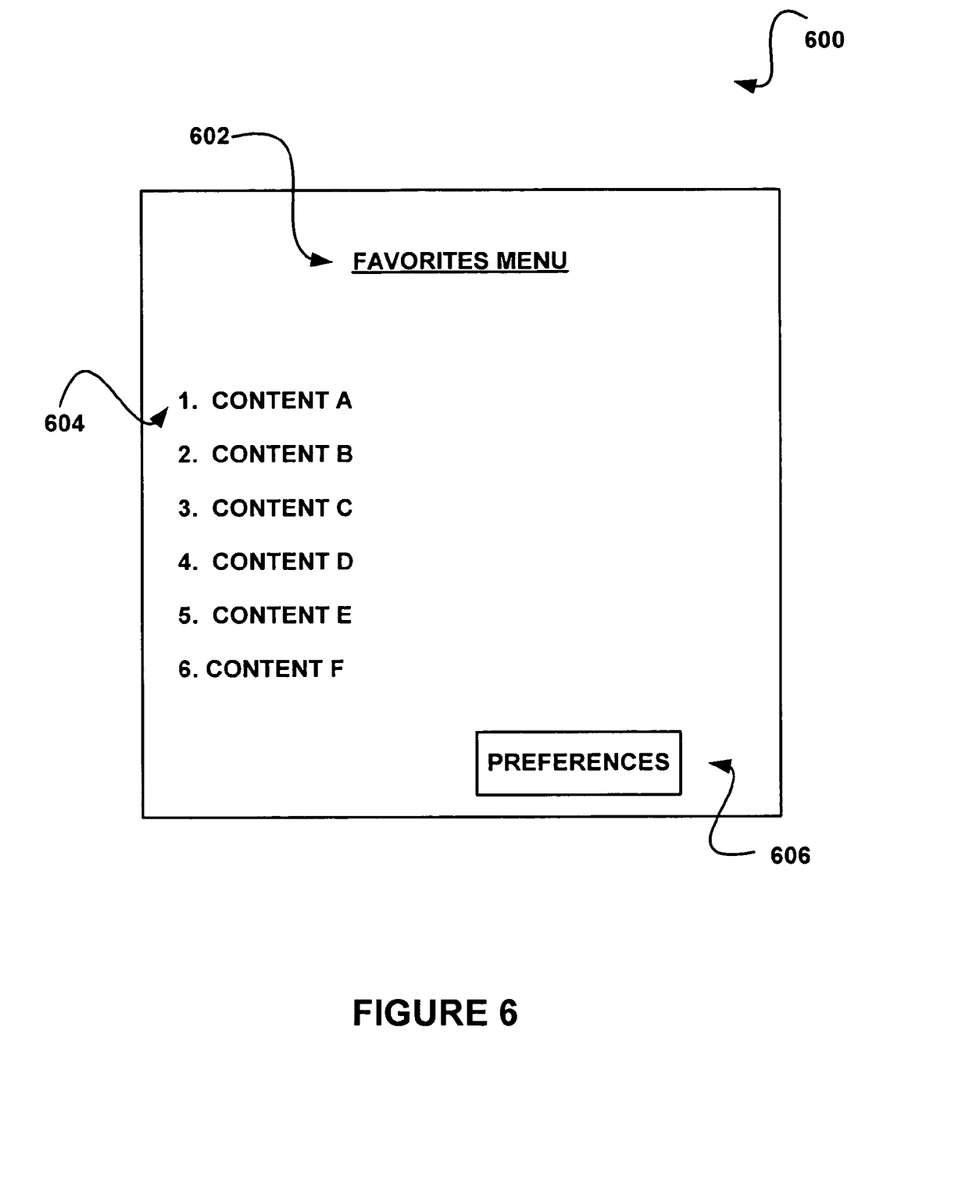
FIG. 6 shows a graphical user interface for displaying a recommendation to a user, in accordance with still yet another embodiment.

FIG. 6 shows a graphical user interface (GUI) 600 for displaying a recommendation to a user, in accordance with yet another embodiment. As an option, the GUI 600 may be implemented in the context of the details of FIGS. 1-5. Of course, however, the GUI 600 may be carried out in any desired environment. Further, the aforementioned definitions may equally apply to the description below.

As shown, the GUI 600 may be presented to the user in the form of a favorites menu 602. Such favorites menu may be displayed to a user utilizing any type of device capable of displaying a GUI to a user, including for example, the devices described with respect to FIG. 1, such as a personal digital assistant, a television, a mobile telephone, a computer, etc.

The GUI 600 may further include a list of content 604 recommended to the user. As described herein, the list of content may include a list of websites, television content, etc. Such content may also be prioritized, such as for example, in the manner described above with respect to operation 508 of FIG. 5. Still yet, the content in the list of content 604 may be selectable by a user, such that upon selection, the content is displayed to the user.

The GUI 600 may further include a preferences selection icon 606. The preferences selection icon 606 may allow a user to predefine a number of contents included in the recommended content 604. In this way, only a specified number of the most recommended contents may be displayed to the user. Optionally, a default value of a predefined number of contents may be utilized prior to a user customizing such predefined number.

In addition, the preferences icon 606 may allow a user to predefine a number of contacts with which content must be associated in order for the content to be included in the recommended content 604. Again, a default value of the number of such contacts may be utilized prior to a user customizing such number. Thus, the user may ensure that the recommended content 604 is recommended by a specified number of contacts.

Also, the preferences icon 606 may allow a user to predefine the degree of relationship of contacts from which content is derived. For example, such predefined degree of relationship may be utilized in decision 412 of FIG. 4 for determining the relationship level of contacts that are recorded.

Still yet, the preferences icon 606 may provide an interest filter, such that a user may customize the types of content included in the recommended content. Examples of such types may include sports, news, history, and/or any other type of content desired by the user. In this way, the user is provided with a technique for customizing the type of content that is recommended.

Furthermore, the preferences icon 606 may include a user configuration parameter which may be utilized by the user to further customize the content included in the recommended content 604. The GUI 600 therefore provides content recommendations to users while also providing a mechanism for a user to customize such content recommendations.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a plurality of contacts, each contact having a relationship with a user;
receiving information associated with activities of at least one of the contacts; and
generating a recommendation for the user, based on the information, utilizing a processor, the recommendation including a list of at least one of websites, television content and selectable content that is displayed to the user upon selection thereof;
wherein the recommendation is generated by:
scoring the information based on a degree of relationship between the user and a contact associated with the information, user-defined interest areas, a user-configured parameter, and a time of receipt of the information; and
prioritizing the information based on the score;
wherein upon the user initiating a communication with one of the contacts through a communication device being utilized by the contact, an automated message is displayed on the communication device to the contact which asks the contact to confirm whether the contact wants to be a contact of the user, such that an agent is downloaded onto the communication device being utilized by the contact based on a response of the contact to the message for receiving a portion of the information that is associated with activities of the contact on the communication device.

2. The method as recited in claim 1, wherein the plurality of contacts are identified utilizing a contact list defined by the user.

3. The method as recited in claim 1, wherein the plurality of contacts are identified utilizing activities of the user.

4. The method as recited in claim 3, wherein the activities of the user include at least one of wireline calls, wireless calls, electronic mail, and instant messages.

5. The method as recited in claim 3, wherein the activities of the user are monitored for a predetermined amount of time, the predetermined amount of time set as a function of a number of identified contacts that is desired.

6. The method as recited in claim 1, wherein a predefined threshold associated with a degree of relationship is utilized in identifying the plurality of contacts.

7. The method as recited in claim 1, wherein the received information includes statistics.

8. The method as recited in claim 7, wherein the statistics are derived from content that is received by a person represented by the at least one of the contacts.

9. The method as recited in claim 7, wherein the statistics are derived from feedback provided by a person that is represented by the at least one of the contacts.

10. The method as recited in claim 7, wherein the statistics are derived over a predetermined period of time.

11. The method as recited in claim 1, wherein contents included in the list are prioritized based on the prioritization of the information.

12. The method as recited in claim 11, wherein the prioritization is based on a score of the information, the score of the information based on a plurality of parameters.

13. The method as recited in claim 12, wherein the plurality of parameters include the degree of relationship between the user and the at least one of the contacts associated with the content, the user-defined interest areas, and the user-configured parameter.

14. The method as recited in claim 1, wherein the received information is aggregated in a database.

15. The method as recited in claim 1, wherein the recommendation is sent to the user utilizing electronic mail.

16. The method as recited in claim 1, wherein the recommendation is displayed to the user utilizing a favorites menu.

17. The method as recited in claim 1, wherein the recommendation is displayed to the user utilizing a mobile phone menu.

18. The method as recited in claim 1, wherein contents included in the recommendation are limited to a predefined number.

19. The method as recited in claim 1, wherein the recommendation includes information associated with a predetermined number of the contacts.

20. The method as recited in claim 1, wherein the recommendation includes the list of websites, television content, and selectable content that is displayed to the user upon selection thereof.

21. The method as recited in claim 1, wherein the received information includes feedback from the contact associated with the information in response to an activity performed by the contact.

22. The method as recited in claim 1, wherein the agent populates itself onto other devices used by the contact such that information associated with a plurality of the contact's devices is received by the user.

23. A computer program product embodied on a non-transitory computer readable medium, comprising:
executable computer code for identifying a plurality of contacts, each contact having a relationship with a user;
executable computer code for receiving information associated with activities of at least one of the contacts; and
executable computer code for generating a recommendation for the user, based on the information, the recommendation including a list of at least one of websites, television content and selectable content that is displayed to the user upon selection thereof;
wherein the computer program product is operable such that the recommendation is generated by:
scoring the information based on a degree of relationship between the user and a contact associated with the information, user-defined interest areas, a user-configured parameter, and a time of receipt of the information; and
prioritizing the information based on the score;
wherein the computer program product is operable such that upon the user initiating a communication with one of the contacts through a communication device being utilized by the contact, an automated message is displayed on the communication device to the contact which asks the contact to confirm whether the contact wants to be a contact of the user, such that an agent is downloaded onto the communication device being utilized by the contact based on a response of the contact to the message for receiving a portion of the information that is associated with activities of the contact on the communication device.

24. A system, comprising:
a processor for:
identifying a plurality of contacts, each contact having a relationship with a user,
receiving information associated with activities of at least one of the contacts, and
generating a recommendation for the user, based on the information, the recommendation including a list of at least one of websites, television content and selectable content that is displayed to the user upon selection thereof;
wherein the system is operable such that the recommendation is generated by:
scoring the information based on a degree of relationship between the user and a contact associated with the information, user-defined interest areas, a user-configured parameter, and a time of receipt of the information; and
prioritizing the information based on the score;
wherein the system is operable such that upon the user initiating a communication with one of the contacts through a communication device being utilized by the contact, an automated message is displayed on the communication device to the contact which asks the contact to confirm whether the contact wants to be a contact of the user, such that an agent is downloaded onto the communication device being utilized by the contact based on a response of the contact to the message for receiving a portion of the information that is associated with activities of the contact on the communication device.

* * * * *